United States Patent [19]

Fritz et al.

[11] 4,314,883

[45] Feb. 9, 1982

[54] GRAPHITE BLOCK HAVING WEAR ZONE AND LOAD BEARING ZONE FOR SIDE REFLECTOR OF HIGH TEMPERATURE REACTOR

[75] Inventors: Rolf Fritz, Oftersheim; Josef Schoening, Hambruecken; Claus Elter, Bad Durkheim; Walter Theymann, Viernheim, all of Fed. Rep. of Germany

[73] Assignee: Hochtemperatur-Reaktorbau GmbH., Cologne, Fed. Rep. of Germany

[21] Appl. No.: 85,873

[22] Filed: Oct. 18, 1979

[30] Foreign Application Priority Data

Nov. 30, 1978 [DE] Fed. Rep. of Germany ....... 2851724
Jul. 26, 1979 [DE] Fed. Rep. of Germany ....... 2930279

[51] Int. Cl.³ .............................................. G21C 5/08
[52] U.S. Cl. .................................... 376/381; 576/458
[58] Field of Search .................. 176/58, 58 PB, 84, 87

[56] References Cited

U.S. PATENT DOCUMENTS 2,225,612 12/1940 Allen ...................................... 176/84
3,069,343 12/1962 Martin ................................... 176/84
3,210,253 10/1965 Huntington ........................... 176/84
4,148,685 4/1979 Brandes ........................... 176/58 PB
4,199,405 4/1980 Schweiger ....................... 176/58 PB

FOREIGN PATENT DOCUMENTS 2354540 5/1970 Fed. Rep. of Germany ... 176/58 PB

Primary Examiner—Sal Cangialosi
Attorney, Agent, or Firm—Schwartz, Jeffery, Schwaab, Mack, Blumenthal & Koch

[57] ABSTRACT

A plurality of graphite blocks forms a side reflector with an area of each block that allows a certain amount of radiation induced wear in a predefined zone facing the core of the reactor and an area separate from the wear zone for carrying the load bearing function of the side reflector. Most critical is the area of the upper range of the reactor core where radiation induced wear is greatest. The wear is taken into consideration in the design layout of the side reflector in the form of an increment to the thickness of the wall. The load bearing areas of each block provide the load bearing area for the entire side reflector. The side reflector is particularly suitable for high temperature gas-cooled reactors of the pebble bed type.

19 Claims, 5 Drawing Figures

GRAPHITE BLOCK HAVING WEAR ZONE AND LOAD BEARING ZONE FOR SIDE REFLECTOR OF HIGH TEMPERATURE REACTOR

BACKGROUND OF THE INVENTION

The present invention relates to a cylindrical side reflector for a nuclear reactor having annuli superposed on each other. A plurality of graphite blocks form the annuli with the graphite blocks extending radially through the entire thickness of the reflector wall. The invention is particularly related to gas-cooled high temperature reactors having a bed of spherical fuel elements.

In all nuclear reactors having graphite side reflectors radiation damage occurs in the graphite after an extended period of operation or with a high power density in the core of the reactor even after a shorter period of time. The radiation damage potentially leads to the crumbling of the parts of the reflector facing the reactor core and possibly to the shutdown of the operation of the reactor. The primary cause of this phenomena is that the flux of rapid neutrons coupled with the power density causes, on the basis of the Wigner effect, dimensional changes in the graphite. Initially, there is shrinking, followed after a certain period of time by expansion with the latter continuing beyond the initial state. The stresses generated in the process may lead to cracking of the graphite. However, side reflectors are expected to have lives under full loads of up to 35 years. The radiation exposure of side reflectors is particularly high in nuclear reactors with spherical fuel elements which must pass through the reactor core only once.

In such a nuclear reactor the spherical fuel elements have attained their final state of depletion desired after a single passage. In the process, a configuration of power density distribution declining from top to bottom is established, related to a high dose of rapid neutrons in the upper third of the reactor core.

Nuclear reactors with spherical fuel elements (pebble bed reactors) have been developed in the prior art wherein the premature shutdown of the reactor operation is avoided by a particular configuration of the side reflector. Thus, a nuclear reactor is known from West German Pat. No. 10 34 784 having a reflector jacket consisting of a bed of uniformly shaped neutron reflecting bodies. The bodies essentially have the configuration of the fuel elements. Similarly, in Austrian patent application No. 9582/63 a nuclear reactor is described with a side reflector consisting of a bed of spherical graphite elements. These elements flow continuously through the reactor core and are constantly replaced by new graphite spheres, so that the exposed part of the side reflector is constantly replaced.

It is known from West German Offenlegungsschrift No. 23 52 691 to design the boundry zone immediately adjacent to the side reflector of the bed of fuel element in a special manner for the protection of the solid side reflector against an excessive dose of fast neutrons, by charging the boundary zone with fuel elements having a lower content of fissionable material than the inner zone of the bed. It has also been proposed to make the boundary zone between the solid side reflector and the bed of fuel elements very narrow and to charge it with pure graphite pebbles.

Another measure to protect the most intensively exposed part of the side reflector is described in West German Offenlegungsschrift No. 23 47 817. This measure consists of providing within the top reflector and the upper part of the solid side reflector materials which absorb neutrons or reduce the velocity of the neutrons. This results in a significant reduction of the flux of fast neutrons in the areas endangered by radiation of the reflector. The materials may be in the form of rods and may be located in suitable cavities. In this known reactor the fuel elements pass only once through the core of the reactor.

In a further nuclear reactor employing a single passage of the spherical fuel elements described in West German Offenlegungsschrift No. 26 12 178, damage to the side reflector is prevented by a specially designed shutdown and control system. This comprises among others a plurality of absorber rods inserted into the side reflector and movable therein. The absorber rods are always located (to a depth of 70%) in the side reflector and reduce the neutron flux in the reflector.

There are also known processes for the replacement of parts of side reflectors composed of square stone-like blocks. Thus, in West German Offenlegungsschrift No. 25 09 025, the operating mode of a manipulator is explained. Individual reflector blocks are removed from the reactor core with the aid of the manipulator. Even though the premature shutdown of the nuclear reactor due to unpredictable damage to the graphite inserts may be prevented in this manner, the replacement or repair, respectively of the damaged parts of the reflector is very time consuming and costly.

In order to avoid these disadvantages, West German Offenlegungsschrift No. 26 43 275 proposes a graphite side reflector built of blocks, which would make the replacement or exchange of reflector blocks unnecessary over the entire lifetime of the nuclear reactor. This is achieved by providing the individual blocks, which extend continuously in the radial direction over the entire thickness of the reflector wall, on their internal front surface with recesses consisting of a series of joints. This measure is based on the concept of simulating the existence of small block dimensions within the area of blocks exposed to particularly high stresses due to neutron irradiation and heat effects. In blocks with significantly smaller internal front surfaces no appreciable stress cracking occurs (however, smaller blocks are more expensive to produce and difficult to install). The disadvantage of this known side reflector rests in the fact that the internal surface of the blocks must be machined, which leads to new problems.

SUMMARY OF THE INVENTION

Based on this state of the art, it is an object of the present invention to provide a side reflector of the type described hereinabove warranting safe operation of the reactor during the entire working life of a high temperature reactor and at the same time eliminate expensive auxiliary installations or time consuming measures such as the replacement or repairing of parts. The present invention is applicable particularly to nuclear reactors with higher power densities, such as gas-cooled high temperature reactors of the pebble bed type as well as any reactor wherein the generation of high notch stresses is to be prevented.

According to the invention, the objects and advantages are attained by providing graphite blocks and a plurality of graphite blocks forming a side reflector with an area that allows a certain amount of radiation induced wear in a predefined zone facing the core of the reactor and an area separate from the wear zone for carrying the load bearing function of the side reflector. Most critical is the area of the upper range of the reactor core where radiation induced wear is greatest. The wear is taken into consideration in the design layout of the side reflector in the form of an increment to the thickness of the wall. The load bearing areas of each block provide the load bearing area for the entire side reflector.

The invention is based on the concept of generally removing the areas of the side reflector exposed to very high dosage values from the operating range of the side reflector so that any resulting failure remains without effect on the functioning of the reflector. The volume of graphite dust and graphite fragments, respectively, to be expected under the present invention differs only in a general way from the amount of graphite dust and pebble fragments accumulating in the known pebble bed reactors (e.g. the THTR-300). Therefore, the safety and operating behavior of the high temperature reactor is not affected by the radiation induced wear in the wear zone.

Each graphite block thus has two areas, each with a different function: first, the part serving as a supporting and container structure and second, the wear zone. The wear zone does not contribute to the tightness and form stability, respectively and thus, to the operating behavior of the side reflector. It has been discovered in tests that the wear zone wherein the load bearing strength of the material drops nearly to zero, remains restricted locally to a narrow area in the reflector. The wear zone migrates beginning with approximately the twentieth operating year in a thickness of 5 mm, annually into the side reflector and attains at the end of the operating life (after 35 years) a depth of 70 mm. In the axial direction the zone appears over a width of approximately 2 m.

In this manner it is assured that the wear of each graphite block will remain confined to a predefined frontal area with respect to the reactor core, if the block has been dimensioned suitably. This concept further utilizes the fact that by means of the decrease of the mechanical strength of the blocks toward their internal front surface, crack propagation into the blocks is hindered. All exposures of the graphite blocks outside the wear zone lead only to stresses which, in keeping with the criteria applied heretofore, are permissible.

Because it is to be expected that with a depth of penetration of the wear zone of 70 mm, the effect of this zone on the entire graphite block to the end of the operating life will remain restricted to approximately 100 mm. It is, of course, possible without further problems to take the wear of the side reflector into consideration in the design layout of the reflector. Accordingly, it is further possible to set a safety factor of 2 to 3.

In order to insure the undisturbed flow of spherical fuel elements through the pebble bed in the case of pebble bed reactors, an advantageous embodiment of the invention is to control the maximum size of the accumulating graphite fragments by further providing a control means. Suitable control means comprise, for example, intentional or predefined fracture locations in the wear zone of the individual graphite blocks. These fracture locations act to determine the size of the accumulating wear products. It may be assumed that the highly stressed graphite within the wear zone will be abraded for the most part by the normal flow of the pebbles. Larger graphite parts which may break off are restricted to a maximum by the predefined fracture locations.

The resulting product of the radiation and abrasion on the wear zone consists of very highly irradiated material. This will often be referred to hereinafter as the "wear product" or "wear product particles" or "fragments". To the extent that the wear product particles are not trickling through the pebble bed, they migrate with the fuel element pebbles through the region of very high neutron flux with constantly rising temperatures. After traversing a path of a few meters, their residual strength has been reduced to only a percentage of their initial value. This fact, together with the physical abrading effect of the flow of pebbles, leads to the extensive dissolution of large wear product particles. This acts to relieve the load on the pebble bed (unfavorable sizes of the fragments could lead to an increase in the apparent density of the pebble bed).

Advantageously, the predetermined fracturing locations in the graphite blocks comprise one or more holes or bores in the block. Such bores are provided in one embodiment in the foremost area (i.e. facing the pebble bed) of each graphite block. By means of a suitable arrangement and distribution of the bores over the highly stressed areas of the graphite blocks, the potential for cracking due to secondary stresses is limited only to fragments of the size of the fuel element pebbles. These may be removed without difficulty with the fuel element pebbles from the core of the reactor. Smaller graphite fragments may be filtered out by way of the gas purification installation of the reactor.

The utilization of bores in the wear zone of the graphite blocks has the favorable side benefit that the phenomena known as the Wigner effect is reduced to even smaller areas. In other words, the bores in the graphite blocks have the effect of simulating graphite blocks with smaller dimensions and resulting favorable rigidity.

In another advantageous embodiment at least one larger bore parallel to the internal front surface of the graphite block is provided at least in the upper region of the reflector. The internal front surface of the block remains unchanged. The bore may be closed with a graphite dowel. This has no effect on the remaining part of the graphite block.

The third advantageous embodiment of the present invention calls for a plurality of smaller bores in each graphite block at least in its upper region arranged in planes parallel to the internal front surface of the graphite block. The bores may extend in the horizontal or vertical direction or in both directions in each plane.

A particularly advantageous further development of this embodiment of the invention comprises a plurality of slits in the internal front surfaces of the graphite blocks. The slits are preferably straight line slits, wherein at the end of each slit a bore forming the base of the slit is provided. The diameter of each bore comprises a multiple of the width of the slit.

In this preferred embodiment, the slits and bores are within an area of the side reflector which is not required to contribute to the density and structural stability of the side reflector, i.e. within the so-called wear zone. Predetermined or intentional fracture locations may again advantageously be provided through them. In a side reflector designed in this manner, further relief of stress concentrations in the load bearing areas of the blocks is obtained. The bores provided at the end of the slits function in the manner of crack arresters, that is, cracks appearing in the case of a failure do not propagate into areas further inside the blocks.

Side reflectors equipped with slits and bores also have the advantage that graphite blocks with slit and bore combinations on their internal front surface are easily manufactured.

As mentioned hereinabove, it is possible to controlling affect the maximum size of potentially appearing graphite fragments by means of bores. Through slits in the frontal surface of each block and their combination with a bore each at the base of the slit, the effect on the size of the graphite fragments may be further enhanced, i.e. the wear products may be restricted to a predetermined maximum. Furthermore, by means of the slit and bore combination, the Wigner effect phenomena is again restricted to smaller areas, i.e. graphite blocks with even smaller dimensions and more favorable rigidities are simulated.

The distance of the bores from the internal frontal surface of each graphite block may be chosen advantageously so that it corresponds approximately to the thickness of the wear zone. The plane defined by the bores forms in the manner the boundary surface of the wear zone.

Under certain conditions, it may be advantageous to set the distance of the bores from the internal front surface of the graphite blocks so that it amounts to a fraction of the thickness of the wear zone and that, therefore, the bores are located entirely within the wear zone.

The bores at the end of the slits in this embodiment preferably have a diameter amounting to approximately three times the width of the slit.

In a preferred embodiment of the side reflector according to the invention the internal frontal surfaces of the graphite blocks exhibit a lattice formed by horizontal and vertical slits. Preferably, the slits of the lattice are at equal distances from each other in both directions.

For certain temperature ranges and exposures of the side reflector of the invention, it is preferred to provide further bores inside the graphite blocks at a greater depth in the horizontal and/or vertical direction than the bores at the termination of the slits. This results in a smoothing of the temperature profile in the individual graphite blocks and thus in a more uniform exposure to stress.

An especially advantageous embodiment of the present invention finds the bores from one graphite block in open communication with the corresponding bores from the adjacent graphite blocks. In this manner, channels or conduit-like areas are formed. Particularly, the bores extending in the vertical direction of a side reflector equipped only with bores as well as a side reflector provided with slits and bores according to the invention form channels or conduits advantageously used to cool the side reflector. This also serves to postpone the onset of the wear phenomena. This is accomplished by means of the bores which make possible a bypass flow of cold cooling gas through the side reflector. The flow of cold cooling gas enters the reactor core after passing through the side reflector bores and mixes with gas at a higher temperature in the reactor core. The bores at the base of the slits may have the size of their diameters controlled by the magnitude of the flow of the cooling gas considered necessary for the adequate cooling of the side reflector.

BRIEF DESCRIPTION OF THE DRAWINGS

In the drawing, four different examples of graphite blocks are shown along with a representation of the assembled side reflector.

A plurality of the blocks together form an annulus (for the sake of simplicity, the graphite blocks are represented in the figures as rectangular shapes) and the cylindrical side reflector is constructed of several annuli set upon each other. The latter surrounds the fuel element pebble bed of a high temperature reactor.

Figure 1:
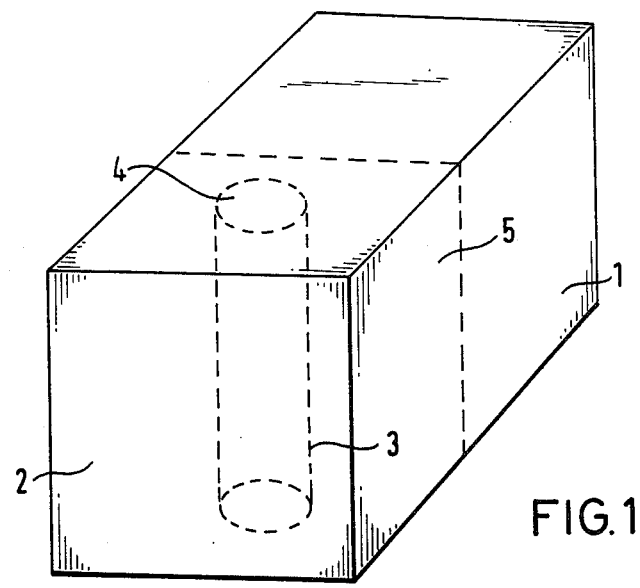
Figure 2:
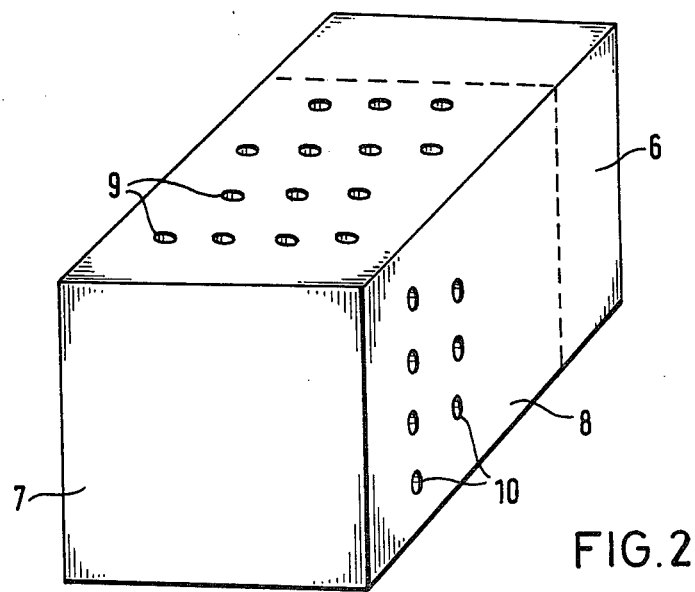
Figure 3:
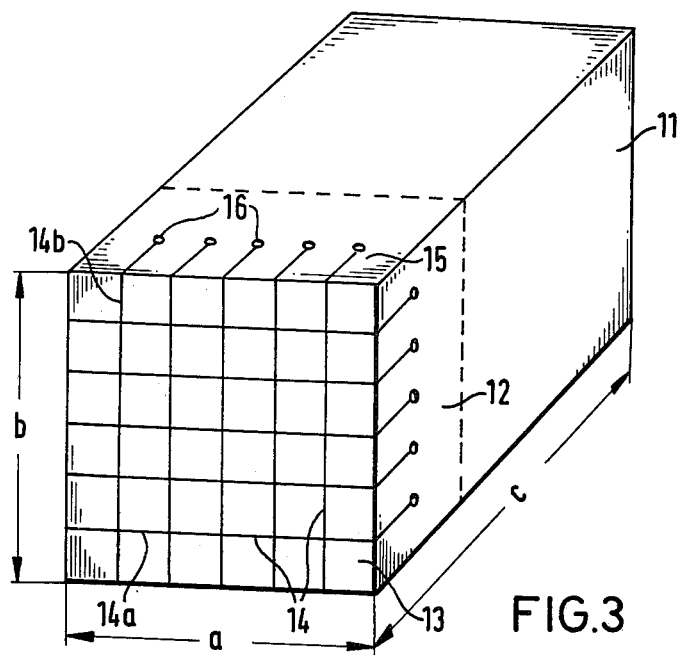
Figure 4:
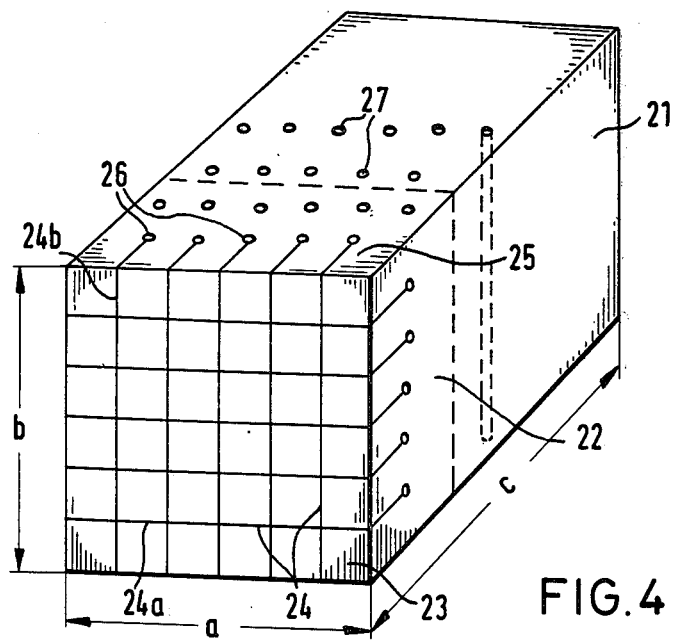
Figure 5:
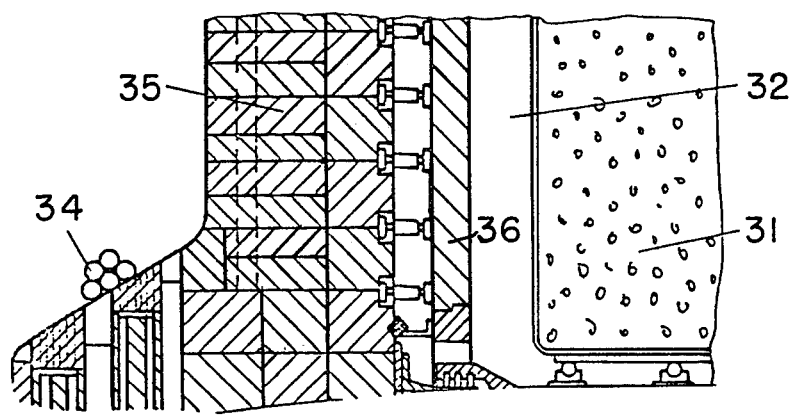

The figures show individually and in perspective representation the following:

FIG. 1 a first graphite block with a single bore in the wear zone;

FIG. 2 a second graphite block with a plurality of smaller bores;

FIG. 3 a further graphite block with a combination of slits and bores;

FIG. 4 a last graphite block with the same combination and additional bores, and FIG. 5 a planar cross section of a side reflector surrounding the reactor core of a high temperature reactor.

DETAILED DESCRIPTION OF PREFERRED EMBODIMENTS

FIG. 1 shows a graphite block with an unaltered internal front surface (i.e. the surface facing the reactor core). The graphite block 1 has a vertical bore 3 which may be sealed with a graphite dowel (not shown). This bore results in a substantial reduction of stress concentrations generated by deformations due to irradiation in the load bearing area of the block. The bore 3 is located within a predefined zone 3, the so-called wear zone which has no supporting function. With a length of the graphite block 1 of 500 mm, the bore 1 may have, for example, a diameter of 120 mm and may be arranged at a distance of 100 mm from the internal front surface.

FIG. 2 displays a graphite block 6, again with an unaltered internal front surface 7. Here again, a definite wear zone 8 is found in the front area of the graphite block 6, the magnitude of the wear zone is considered in the design layout of the side reflector. Within the wear zone 8, numerous smaller bores 9 and 10 are provided in several planes parallel to the internal front surface 7, they serve as intentional or predefined fracture locations and also to reduce stresses. The bores 9 are arranged vertically, while the bores 10 are located horizontally in the planes. Cold cooling gas flows through the bores 9 as a bypass to the bed of spherical fuel elements, thus cooling the graphite block 6.

With a block of 500 mm, the bores 9 and 10 preferably have a diameter of about 6 mm. Their distance to each other and of the front bores to the internal front surface 7 is about 40 mm.

The graphite block 11 shown in FIG. 3 has a width a of 250 mm, a height b of 250 mm and a length c of 500 mm. A predefined wear zone 12 is located in the front area of the graphite block 11, the magnitude of which is taken into consideration in the design layout of the side reflector. In this example, it amounts to, for example, approximately 70 mm. The wear zone 12 has no supporting function of the block itself or the side reflector formed of a plurality of such blocks.

On the internal front surface 13 of the graphite block 11 of FIG. 3, a lattice 14 is provided by cutting into the graphite block. The lattice consists of vertical slits 14b and horizontal slits 14a. Both of the slits 14a and 14b are at a distance of approximately 40 mm from each other and they are cut into the graphite block 11 to a depth of approximately 40 mm. Thus, on the surface of the graphite block 11 individual blocks 15 of a cubic shape are formed. The width of each of the slits 14a, 14b is approximately 2 mm. With the aid of the lattice 14, the size of the potentially crumbling reflector fragments may be limited to a predetermined maximum.

At the end of each slit 14a, 14b, a bore 16 is provided. These bores form the base of the slit. The diameter of all of the bores 16 equals three times the width of the slits, i.e. 6 mm. Cold cooling gas flows through the bores 16 acting as a bypass to the bed of spherical fuel elements of the high temperature reactor. In this fashion, adequate cooling of the side reflector is effected.

In addition to cooling the reflector, the bores afford another desirable effect: the possibility of stress considerations caused by radiation induced deformations in the load bearing area are significantly reduced. In the case of failure, the bores act also as crack arresters.

FIG. 4 again shows a graphite block 21 with a lattice 24 consisting of horizontal slits 24a and vertical slits 24b. The lattice has dimensions identical with those of the graphite block of FIG. 3. The predefined wear zone is designated by 22. A bore 26 is located at the base of each slit. The lattice 24 forms individual blocks 25 of a cubic shape on the front surface 23 of the graphite block 21.

The graphite block 21 displays additional bores running in the vertical direction. These bores are in alignment with one another as shown in FIG. 4 and provide additional flexibility with respect to temperature control of the graphite block and, correspondingly, control of the stresses within the block and side reflector. The equalization of the temperature profile of the block is achieved by these additional bores.

FIG. 5 shows a cross section of a portion of a high temperature reactor. The core 33 is installed in a cavity 32 of a cylindrical pressure vessel of prestressed concrete 31. The core contains a bed of spherical fuel elements 34. The bed and core area are surrounded by the side reflector 35 (also referred to as to annular lateral reflector). The side reflector is constructed of a plurality of graphite blocks positioned next to one another forming an annulus about the reactor core. Several of these annuli are stacked one on top of the other to make up the side reflector. An annular thermal side shield 36 surrounding the side reflector 35 is also disclosed.

Any changes and modifications in the abovedescribed embodiments of the invention can, of course, be carried out without departing from the scope thereof. Accordingly, that scope is entitled to be limited only by the scope of the appended claims.

What is claimed is:

1. A graphite block for the side reflector of a nuclear reactor comprising:
   a radiation induced wear zone in the area of said block having a frontal surface facing the reactor core,
   a load bearing zone separate from said wear zone,
   a plurality of straight line slits in the frontal surface of said wear zone, and
   a first plurality of bores in said wear zone wherein each bore is located adjacent and contiguous with the terminus of one of said straight line slits each of said slits having a bore.

2. The graphite block of claim 1 wherein certain of said bores extend horizontally through said block and certain of said bores extend vertically through said block.

3. The graphite block of claim 1 further comprising a graphite dowel in sealing relationship with said bore.

4. The graphite block of claim 1 wherein said slits form a lattice-like appearance on the frontal surface of said wear zone and said bores extend horizontally and vertically through said wear zone.

5. The graphite block of claim 4 further comprising a second plurality of bores arranged at a greater distance from the frontal surface of said wear zone than said first plurality of bores.

6. The graphite block of claim 11 wherein said bores are arranged in planes parallel to the frontal surface of said wear zone.

7. The graphite block of claim 4 or 5 wherein said slits form a square lattice-like appearance.

8. The graphite block of claim 1 wherein said bore has a diameter of about 2 to 5 times the width of said slit.

9. The graphite block of claim 8 wherein said diameter is 3 times said width.

10. The graphite block of claims 4 or 5 wherein the greatest distance of said bores from the frontal surface of said wear zone defines the thickness of said wear zone into the graphite block.

11. The graphite block of claims 4 or 5 wherein the greatest distance of said bores from the frontal surface of said wear zone is a fraction of the thickness of said wear zone.

12. The graphite block of claims 4 or 5 wherein said wear zone is about 70 mm in width and the graphite block is about 250 mm in width.

13. A side reflector for a high temperature gas-cooled nuclear reactor comprising a plurality of graphite blocks of claim 1 arranged immediately adjacent each other about a reactor core.

14. A side reflector for a high temperature gas-cooled nuclear reactor of claims 1, 4 or 5 wherein said bores of one graphite block are in communication with the corresponding bores or the adjacent graphite block, said blocks being arranged adjacent each other about a reactor core.

15. The side reflector of claim 14 wherein said bores extending vertically through the side reflector comprise conduits for cooling gas through the side reflector.

16. A gas-cooled high temperature pebble bed reactor comprising a reactor core arranged in a cavity in a prestressed pressure vessel, a side reflector of a plurality of graphite blocks arranged in a plurality of annuli about said reactor core and a cooling circuit for the reactor, each of said graphite blocks having a wear zone facing said reactor core and a load bearing zone separate from said wear zone, a plurality of straight line slits in the frontal surface of said wear zone, and a first plurality of bores in said wear zone wherein each bore is located adjacent and contiguous with the terminus of one of said straight line slits each of said slits having a bore.

17. A gas-cooled high temperature pebble bed reactor of claim 16 wherein said means for controlling stresses and the degree of abrasion in said wear zone is selected from the group consisting of bores extending through said wear zone of each graphite block, slits in the surface of each graphite block facing said reactor core and combinations thereof.

18. A gas-cooled high temperature pebble bed reactor of claim 17 wherein said means for controlling stresses and the degree of abrasion in said wear zone comprises a plurality of bores in said side reflector and in communication with said cooling circuit wherein cooling gas flows through said bores to cool said side reflector.

19. A gas-cooled high temperature pebble bed reactor of claim 17 wherein said means for controlling stresses and the degree of abrasion in said wear zone is arranged in the upper area of said reactor core.

* * * * *